United States Patent

[11] 3,632,277

[72] Inventor John D. Stalter
Elkhart, Ind.
[21] Appl. No. 757,536
[22] Filed Sept. 5, 1968
[45] Patented Jan. 4, 1972
[73] Assignee Nibco, Inc.
Elkhart, Ind.

[54] METHOD AND APPARATUS FOR MOLDING ELBOWS AND THE LIKE
4 Claims, 14 Drawing Figs.

[52] U.S. Cl.................................................. 425/438,
249/66, 249/63, 425/443, 425/236, 425/408
[51] Int. Cl............................................... B29d 23/02,
B29c 9/00
[50] Field of Search........................................ 18/42 D, 42
M, 45 M, DIG. 56; 249/184, 185, 186, 63, 64, 66,
67, 68

[56] References Cited
UNITED STATES PATENTS

| | | | |
|---|---|---|---|
| 2,436,065 | 2/1948 | Dewey | 18/DIG. 56 |
| 2,483,093 | 9/1949 | Harvey | 249/68 |
| 2,718,032 | 9/1955 | Harvey | 249/67 X |
| 2,770,011 | 11/1956 | Kelly | 18/42 D X |
| 3,013,308 | 12/1961 | Armour | 18/42 D UX |
| 3,049,758 | 8/1962 | Drevalas | 18/42 D |
| 3,064,310 | 11/1962 | Cooprider | 18/42 D X |
| 3,074,113 | 1/1963 | Specht | 249/63 X |
| 3,095,613 | 7/1963 | Christensen et al. | 18/45 M X |
| 3,152,365 | 10/1964 | Fisher | 18/DIG. 56 |
| 3,222,727 | 12/1965 | Ford et al. | 18/45 M X |
| 3,343,801 | 9/1967 | Munger et al. | 249/185 X |

FOREIGN PATENTS

| 731,146 | 2/1943 | Germany | 249/63 |
|---|---|---|---|

*Primary Examiner*—J. Howard Flint, Jr.
*Attorney*—Price, Heneveld, Huizenga & Cooper ABSTRACT: An injection-molding apparatus including a mold structure having a plurality of spaced, adjacent internal mold cavities, with the mold structure formed of a pair of relatively movable members, each of which have concavities comprising half of each such molding cavity, wherein the molding cavities have a curving shape designed for the molding of curved objects, wherein the mold structure members form parting lines along each side of such object which lie in planes spaced from and parallel to the plane in which the longitudinal axis of the molded object lies, and wherein one mold structure member is moved relative to the other when the two members are parted in a manner which wipes the molded objects off a central core structure used to produce tubular objects.

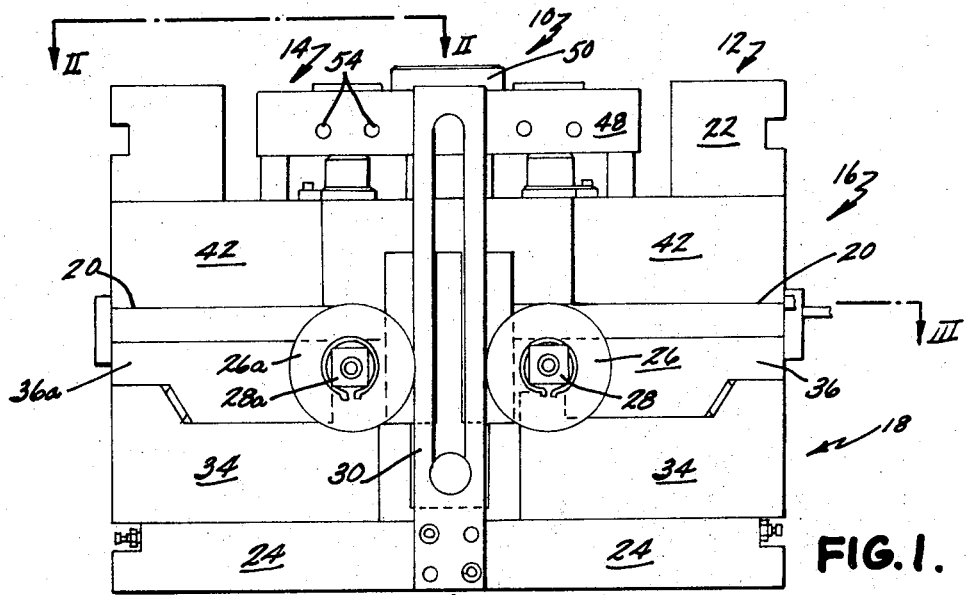
FIG. 1.
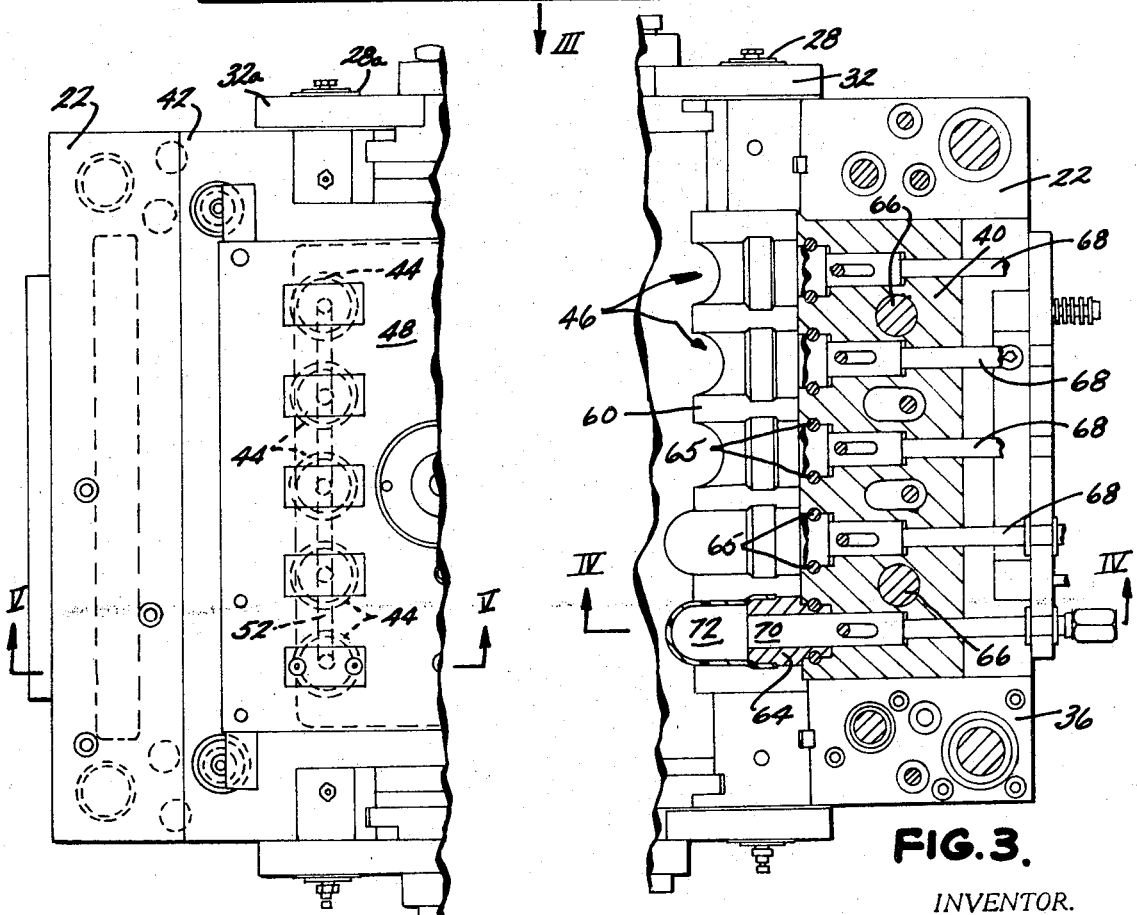
FIG. 2.
FIG. 3.
INVENTOR.
JOHN D. STALTER

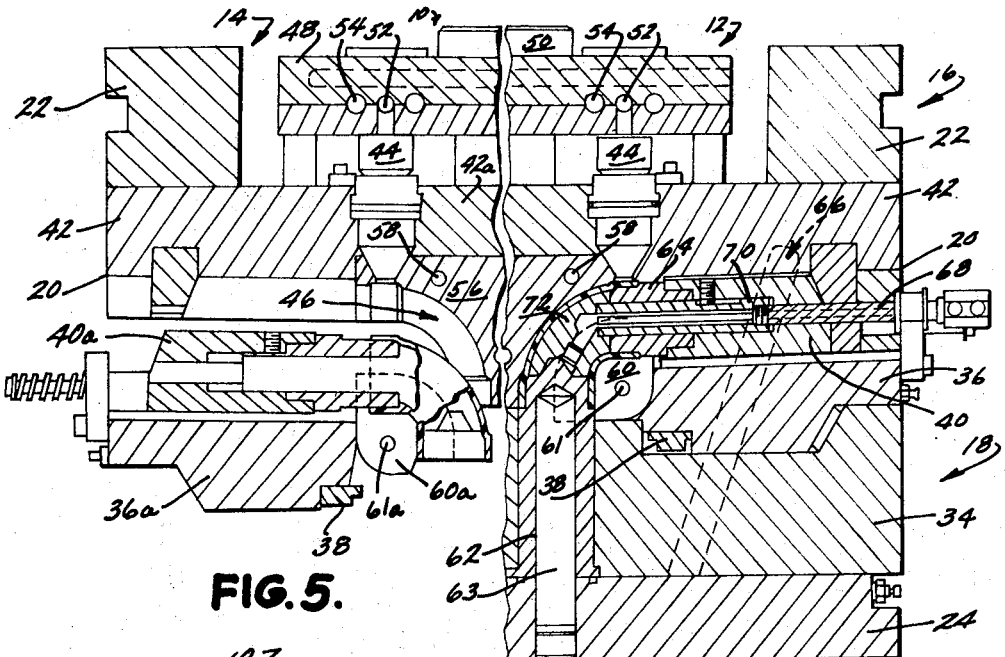
FIG. 5.
FIG. 4.
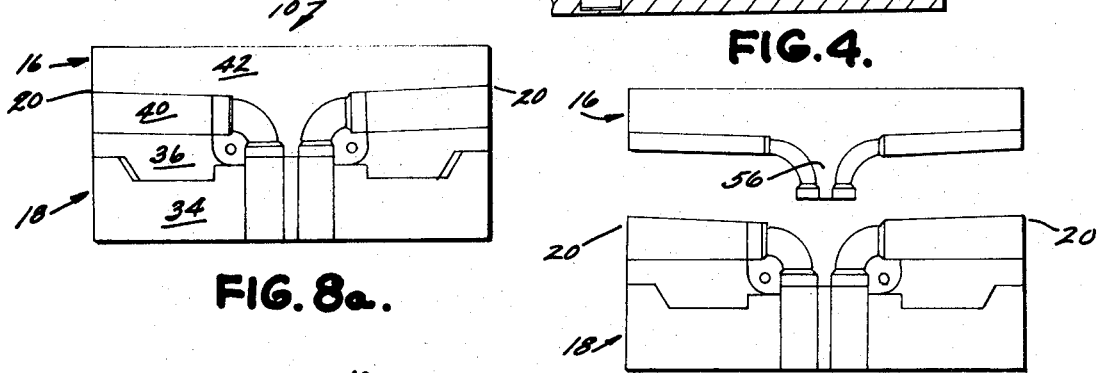
FIG. 8a.
FIG. 8b.
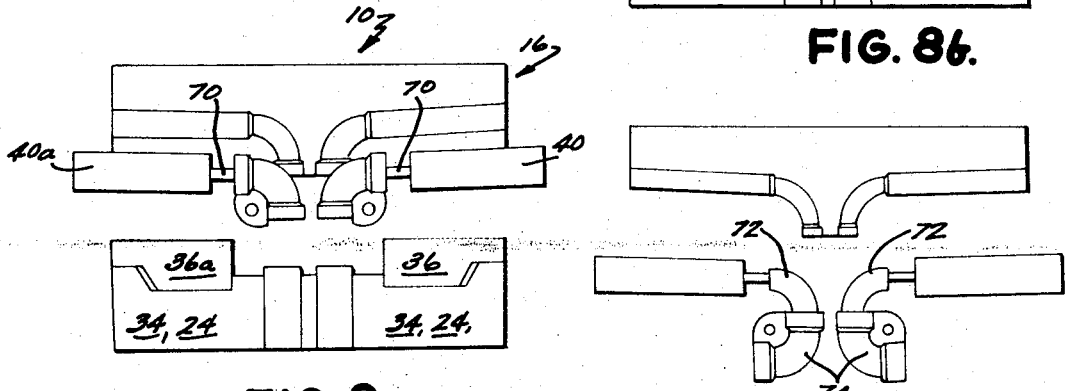
FIG. 8c.
FIG. 8d.
INVENTOR.
JOHN D. STALTER
BY Price, Heneveld
Huizenga & Cooper
ATTORNEYS

INVENTOR.
JOHN D. STALTER

INVENTOR.
JOHN D. STALTER
BY Price, Heneveld
Huizenga & Cooper
ATTORNEYS

METHOD AND APPARATUS FOR MOLDING ELBOWS AND THE LIKE

BACKGROUND

The present invention relates primarily to the molding of conduit elbows, particularly (but not necessarily exclusively) 90° elbows, made through injection-molding techniques using synthetic resins or other such plastics as a molding material.

In the past, the production of such elbows by injection molding has been a time-consuming process in which the molds used had a pair of vertically separable parts, each of which defined half of four molding cavities laid out in an end-to-end, loop-shaped pattern. Appropriate central cores were inserted into each mold cavity prior to commencing the actual molding process, and these cores were laboriously removed from each elbow after the same had been molded.

Such an arrangement was slow from a production point of view, since only four elbows could be made at any one time in any given mold structure, and this arrangement did not lend itself to any significant degree of automation inasmuch as after the elbows were molded and the mold separated to expose the molded elbows, each elbow had to be removed from the mold individually, and the central core of each molded elbow had to be removed from the elbow itself in an individual manner.

SUMMARY

The present invention provides injection-molding apparatus utilizing a different concept in mold cavity arrangement and mold structure as well as a different mode of operating which is highly conducive to completely automated techniques and which provides for the simultaneous molding of a large number of elbows.

Briefly stated, the mold structure of the invention has molding cavities oriented with their longitudinal axes disposed in spaced, parallel planes which extend in the direction in which the mold structure members are parted or separated to expose the molded objects. Also, the parting lines for the different individual mold cavities lie in planes which are parallel to the plane of the longitudinal axis thereof, and spaced on either side of such plane. Furthermore, the central core for each mold cavity includes a first portion which is retracted away from the molded object when the mold structure is separated to expose the latter, and also includes a second portion which remains in place when the mold is opened, following which the molded objects are wiped from the central core portion by being urged along a path of movement constituting an endwise projection of the aforementioned central core member. In this manner, the finished objects are automatically made in large numbers within a single mold structure, from which they are automatically ejected.

DRAWINGS

In the drawings:

FIG. 1 is a simplified end elevation of the apparatus of the invention;

FIG. 2 is a fragmentary, enlarged overhead plan view of the left-hand portion of the apparatus shown in FIG. 1, taken along the plane II—II thereof;

FIG. 3 is a fragmentary, enlarged overhead sectional plan view of the right-hand portion of the structure shown in FIG. 1, taken through the plane III—III thereof;

FIG. 4 is an enlarged, fragmentary vertical section taken through the plane IV—IV of FIG. 3, showing the right-hand portion of the apparatus;

FIG. 5 is a view similar to FIG. 4, but taken along the plane V—V of FIG. 2 and showing the left-hand portion of the apparatus, with certain parts in a moved position;

Figure 6:
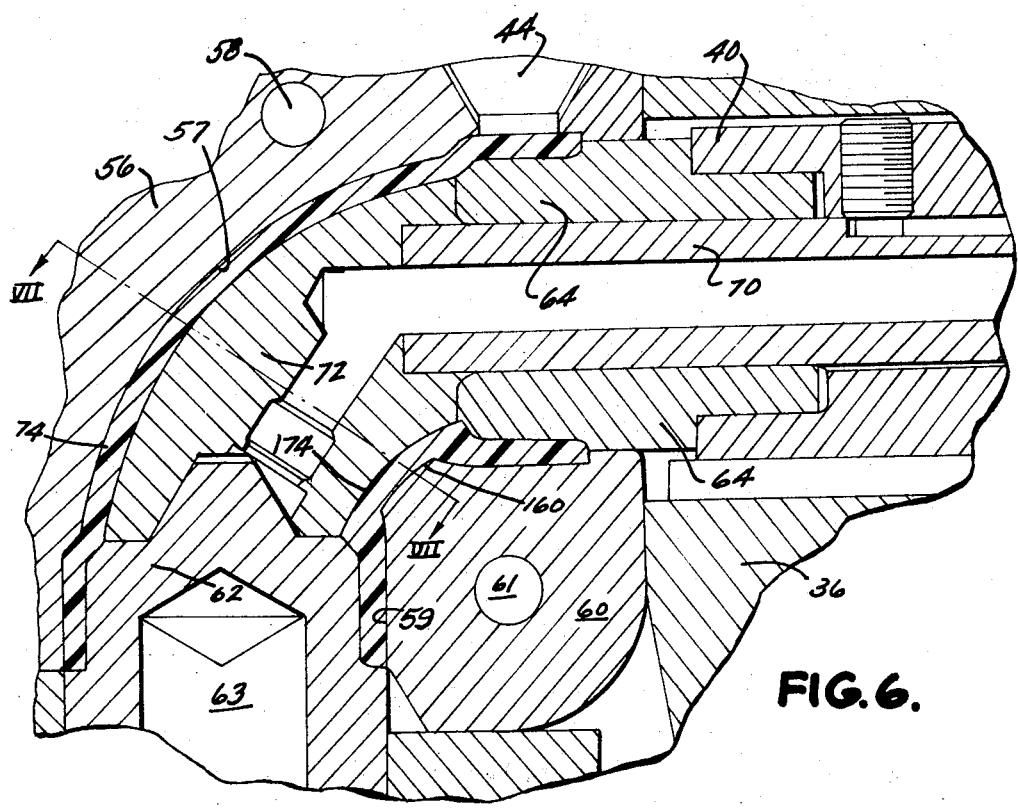
FIG. 6 is a greatly enlarged, fragmentary sectional elevation of a portion of the structure seen in FIG. 4.
Figure 9:
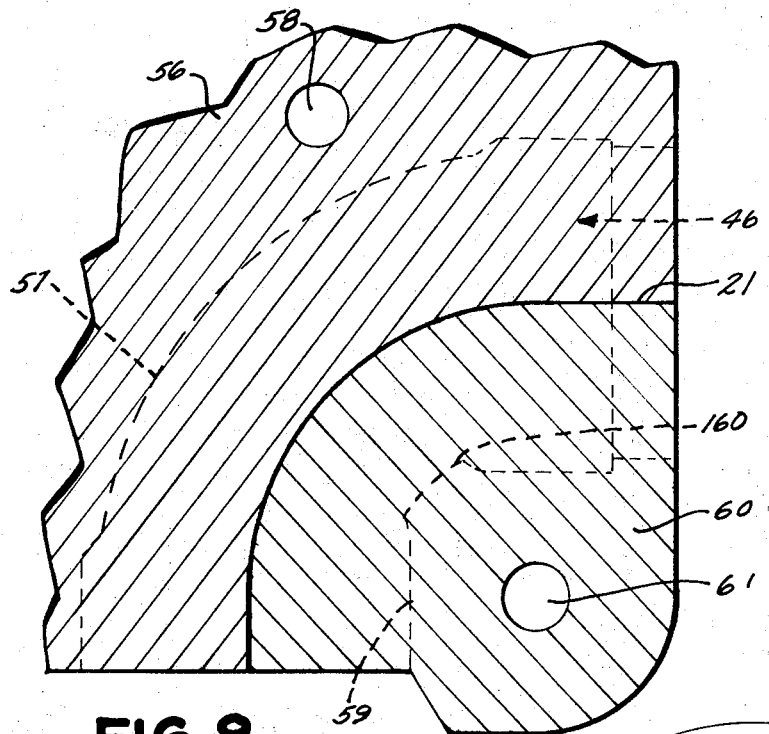
Figure 10:
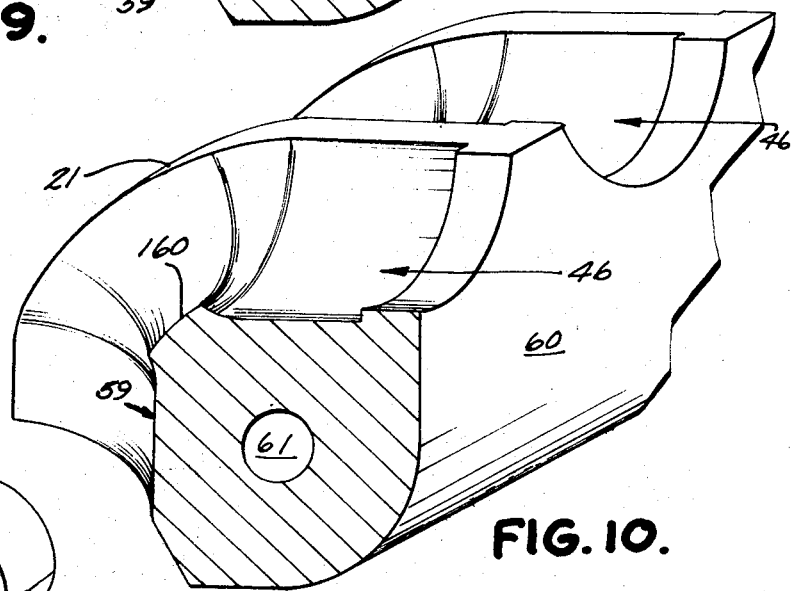
Figure 11:
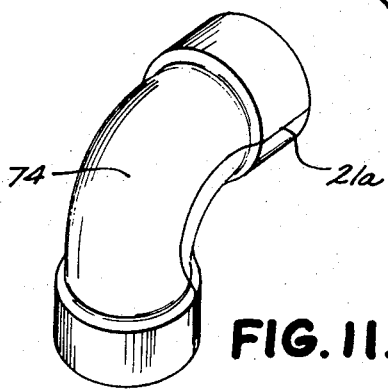

FIGS. 8a, 8b, 8c, and 8d are a succession of simplified end elevational views of the apparatus showing the sequential movements occurring during one cycle of operation;

FIG. 9 is an enlarged fragmentary sectional elevation similar to FIG. 6 but showing other structural details;

FIG. 10 is an enlarged fragmentary perspective view of one of the lower mold cavity members; and FIG. 11 is a perspective view of a molded object in accordance with the invention.

PREFERRED EMBODIMENT

Referring now in detail to the drawings, the apparatus 10 of the invention is a multicavity molding structure which generally speaking, is symmetrical about a vertical plane, and thus includes a right-hand portion 12 and a left-hand portion 14, which are structurally interconnected and substantially mirror images of one another. Each such symmetrical portion of the apparatus 10 includes top and bottom portions designated 16 and 18, respectively, in the right-hand side 12, which are separable along a compound parting line 20, discussed in more detail subsequently. General structural attributes of the apparatus seen in FIG. 1 include a pair of horizontally extending, laterally slotted attachment rails 22, which are secured to the top portion 16 for mounting the same against vertical movement and a rigid baseplate 24 to which the other elements of the bottom portion 18 are mounted, and by which the latter may be lowered and raised vertically with respect to the top portion. Visible in FIG. 1 are a pair of gearwheels 26, 26a mounted on rotatable members 28, 28a having endwise-extending squared shafts, as indicated, together with an upright double-faced rack element 30, having oppositely disposed edges with teeth which mesh with the teeth on gear wheels 26, 26a, for rotating the same upon vertical movement of the base plate 24, to which the rack element 30 is affixed. As illustrated in FIGS. 2 and 3, the rotatable members 28, 28a extend through the apparatus 10 and protrude from the end opposite that where gearwheels 26, 26a are located, and at such opposite end of the apparatus a duplicate set of such gearwheels 32, 32a are similarly mounted on these members, and similarly meshed with a vertically positioned rack element directly comparable to that designated 30.

Directly atop the aforementioned baseplate 24 is a heavy, thick support block 34 which may extend laterally across the entire apparatus. Atop the support block 34 on either side of the apparatus are a pair of support table members 36, 36a which rest upon the support block in wide channels and are secured thereto as by rigid key members 38 (FIG. 4). Atop the support table 36 on either side of the apparatus is a rigid backing plate member 40, 40a (FIG. 4) having a thickness which is slightly greater than the diameter of the part to be molded. The upper surface of the backing plates 40, 40a form the aforementioned parting line 20.

The top portion 16 of the apparatus may be considered a generally unitary member, which basically has no parts which move with respect to other parts of this portion. The aforementioned attachment rails 22 are secured atop a medial support member 42, through which appropriate vertical apertures are formed for mounting an injection nozzle 44 (FIG. 4) above each of the molding cavities, indicated generally by the numeral 46 (FIGS. 1 and 3) and described in more detail hereinafter. As illustrated in FIG. 4, the medial support 42 includes a central portion 42a which spaces the two series of injection nozzles 44 serving the opposite lateral portions 12 and 14 of the apparatus. The injection nozzles are held in place vertically by a rigid upper support plate 48 (FIGS. 1 and 5), which is rigidly mounted to the medial support member 42, as by a central columnlike securing means 50. As may be seen in FIGS. 1, 4 and 5, the upper support plate 48 has passages 52, 54 formed longitudinally therein. The passages 52 are runners for supplying injecting materials to the various injecting nozzles 44, whereas the passages 54 provide a path for circulating coolant through this portion of the apparatus.

Centrally of the upper portion 16 of the apparatus, and beneath the central portion 42a of the medial support 42, is a horizontally extending first or upper mold structure member 56, which is of generally triangular cross section (FIGS. 4 and 5). This member forms the top half of the various molding cavities 46, with one such series thereof being formed in each of the lower lateral sides of this member. As illustrated, the bottom portions of the various injection nozzles 44 extend downwardly through the lateral portions of the upper mold member 56, to communicate with the various molding cavities 46 at the top of their lateral end extremities. The upper mold member 56 is secured to the medial support member 42 located thereabove, for unitary operation with the remainder of the upper portion 16 of the apparatus. A series of longitudinally extending cooling passages 58 are formed in this mold member, as shown.

Mounted above the support block 34 in the bottom portion 18 of the apparatus, and at the inner end extremity of each of the support table members 36, 36a positioned immediately above support block 34 on each lateral side of the apparatus, is a second or lower mold structure member 60 (FIGS. 3, 4, 6, 9 and 10) for the right-hand portion 12 of the apparatus, with a like lower mold member 60a for the left-hand such portion. These mold members, like the first or upper mold member 56 noted above, extend longitudinally across the apparatus, and each forms the lower half portion of each molding cavity 46 in each lateral sequence thereof, i.e., the upper mold member has a series of curving, concave recesses or concavities in each of its lower lateral sides which register with a complementary such series of concavities formed in each of the lower mold members 60, 60a such that when the upper and lower mold members 56 and 60 are brought into mutually contacting juxtaposition, the various concavities register to form a series of complete molding cavities for the curved elbows to be produced. Thus, the curving uppermost side 57 of each concavity in the upper mold member 56 defines the longest arcuate side of the molded object 74, and in similar fashion the curving lowermost side 59 of each concavity in the lower mold member 56 defines the shortest arcuate side of the molded object.

The lower mold members 60, 60a are mounted for rotation about a central shaft 61, 61a, respectively (FIGS. 4 and 5), upon external support means (not specifically shown), so that these mold members may rotate with respect to all other parts of the top portion 16 and the bottom portion 18. The desired arrangement is such that the top and bottom portions of the apparatus may be separated as aforesaid along parting line 20 by lowering the entire bottom portion away from the top portion at least a limited distance, with the lower mold members 60, 60a moving downwardly together with the support table members 36, 36a, the support block 34, and the base plate 24. Following such initial movement, however, the lower mold members 60, 60a are held against further downward movement, while the remainder of the bottom portion 18 continues to move downwardly. Details of this operation are stated more fully hereinafter, but the foregoing basic nature of this operation are stated more fully hereinafter, but the foregoing basic nature of this operation is set forth here so that the fundamental or basic requirements of exterior support structure which is not specifically illustrated will be readily understood.

The molding cavities 46 formed by the upper and lower mold members 56 and 60, will thus have a bottom end opening facing downwardly and a top end opening which faces the right side of the apparatus (of course, the same basic situation is true of the left-hand portion of the apparatus, and remarks addressed to either are equally applicable to the other). The bottom such series of cavity end openings is closed by a series of upwardly extending generally cylindrical end-forming core portions 62, (FIGS. 4 and 6) which are fixedly mounted in the support block 34. Each such core portion preferably has a hollow central passage 63, through which coolant may be circulated. The upper or lateral end openings of the various molding cavities are closed by tubular end-forming plug members 64 (FIGS. 3, 4 and 6) which are secured along the inner end of the aforementioned backing plates 40, 40a. Preferably, the plug members 64 are secured in place with respect to the backing plate 40 by driftpins 65 (FIG. 3). The backing plate 40 is laterally slidable atop its support table member 36 outwardly with respect to the apparatus. This slidable movement is brought about by upwardly extending guide pins 66 (FIGS. 3 and 4) which are positioned at an outward angle with respect to the vertical and which are slidable within appropriate passages extending through the backing plate. These guide pins are anchored in the support block 34, and these are fixed with respect to the support table 36, through which they extend upwardly. Due to their slidable fit within the backing plates 40, however, the guide pins will move vertically downward in unison with downward movement of the support table and block and the baseplate, while simultaneously causing lateral retroaction of the backing plate.

As previously stated, the end-forming plug member 64 at the top of each of the mold cavities is tubular in nature, and the central opening therein is located in direct alignment with one of a series of stepped passages (FIGS. 3 and 4) extending inwardly from the side edge of the backing plates 40, 40a. Within each such passage is a control rod 68 whose inner end is threaded onto the outer end extremity of a tubular extension 70 which passes slidably through the aforesaid central opening in the plug members 64. The extensions 70 are each unitary with a curved central core portion 72 (best shown in FIG. 6) positioned in central alignment within each of the molding cavities 46, to form the hollow interior of each of the objects to be molded. As illustrated, the lower end extremity of each central core portion 72 mates with the upper extremity of one of the upright end-forming core portions 62 mentioned previously, whereas the upper or lateral end extremity of the various central core portion 72 (comprising an annular shoulder disposed concentrically about the tubular extension 70 mates with the end extremity of the tubular end-forming plug 64).

As stated, each of the extensions 70 and its corresponding central core portion 72 are unitary members, either made integrally or by rigidly connecting two separate parts together. As illustrated, the control rods 68, the tubular extensions 70, and the central core portions 72 all have hollow internal passages which communicate with each other, so that coolant pumped through such passages will pass through the interior area of the objects molded in the various molding cavities. The internal passages within the core portion 72 preferably also communicates with the internal passage 63 in the upright core portions 62, so that the coolant may be circulated through all of these members.

OPERATION

To begin a cycle of molding operation, the various parts of the apparatus are placed in the position shown in FIG. 4, and molding material is forced into the runners 52, from which it enters each of the various injection nozzles 44 and is injected into each of the molding cavities 46. With the central core portions 72 in place within each cavity, a curved tubular void exists therewithin for receiving the molding material, and when each such void is filled, the injection of the material ceases. Following injection of the molding material, coolant is pumped through the various cooling channels and passages pointed out hereinabove, so that the molding material within the cavities is solidified and cured, and a completed molded object thus produced. The apparatus then undergoes the following movements, resulting in the automatic ejection of each molded object.

First, from the relative positioning of the parts of the apparatus illustrated in FIGS. 4 and 6 and pictorially represented in FIG. 8a, the entire bottom portion 18 of the apparatus moves downwardly with respect to the top portion, thereby parting the mold apparatus at the aforementioned parting line 20. This basic move is illustrated in FIG. 8b. As a result of this movement, the upper extremities of each of the molded objects leaves the upper mold member 56 and is exposed.

Next, as illustrated pictorially in FIG. 8c, the downward movement of the backing plate 40, the control rod 68, end-forming plug 64, and the lower mold member 60, is stopped with respect to the remainder of the bottom portion 18 of the apparatus, i.e., with respect to the baseplate 24, support block 34, and the support table members 36, 36a, all of which continue downwardly a brief distance. It is important to note that during this relative movement, a lower extremity of the rack element 30 which is devoid of teeth on its side edges passes by the gear wheels 26 without turning the same, thereby providing a lost-motion feature which allows two things to occur before the aforementioned gears are rotated. First, the downward movement of the baseplate and support table members retracts the lower core portions 62 downwardly away from the lower end extremity of the molded objects within the molding cavities. At the same time, the downward movement of the baseplate and support tables moves the guide pins 66 downwardly with respect to the backing plates 40, and this cams the backing plates laterally and outwardly, toward their respective side edges of the molding apparatus. Since the tubular plug members 64 are pinned to the backing plates, this lateral movement of the latter also retracts the plug members 64 outwardly and away from the upper end extremities of the molded objects, with the plug members 64 sliding along the tubular extensions 70 of the central core portions.

When the foregoing has occurred, the rack elements 30 begin to rotate the gears 26, 26a and 32, 32a at the opposite end of the molding apparatus. The squared shaft extensions 28, 28a on which the aforementioned gears are mounted comprise lateral extensions of the lower mold members 60, 60a, which thus are rotated as a consequence of the rotation of the gears. As indicated in FIG. 8d, this rotation of the lower mold members ejects the molded objects 74 from the mold cavities by wiping the objects off the curved central core portions 72, i.e., the rotation of the lower mold members 60, 60a moves the molded objects along a curved path comprising a projection of the longitudinal axis of the central core portions. Thus, at or before the point of rotation indicated in FIG. 8d, the molded objects 74 drop free of the central core portions and fall downwardly to a place where they may be collected. In this latter connection, it is to be noted that a suitable catch means (not illustrated) may be automatically moved into position beneath the molded objects just prior to the time when they are moved free of the central core portions. Following this, the various parts of the molding apparatus reverse their aforementioned movements and are placed back in the initial molding position, from which point a successive automated molding cycle ensues.

Figure 7:
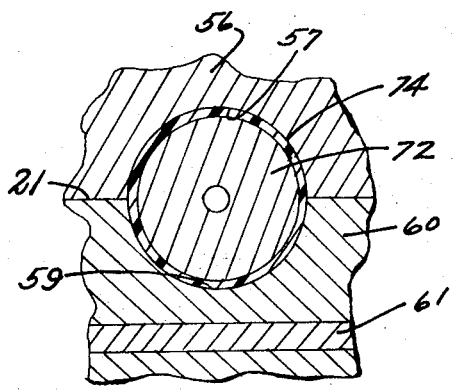
FIG. 7 is a fragmentary sectional elevation taken through the plane VII—VII of FIG. 6.

In connection with the aforementioned parting and ejecting movements of the various portions of the present molding apparatus, it should be noted that the lower mold members 60, 60a act to hold the molded objects 74 in the same position in which they were molded during the retraction away from such objects of the various lower end-forming core portions 62 and the upper end-forming core portions 64, i.e., during the period in which there is no rotary movement of the lower mold members 60, 60a. The configuration of the concavities in these lower mold members greatly facilitates this operation, in that the walls of each concavity form a generally U-shaped yokelike structure (FIGS. 7, 9 and 10) which acts as a saddle in vertically supporting each molded object 74. Moreover, the narrowness of the upwardly oriented edge 160 (FIGS. 6 and 9) of the lower mold members 60, 60a in the area where the shortest arcuate side 174 of the mold object is formed engages the outer periphery of this side of the object after the object is fully formed in the manner of a gear tooth engaging a complementary member. In this manner, the lower mold members 60, 60a have a very sure grip on the molded objects, and are easily able to hold the same in place against any tendency toward movement initiated by withdrawal of the two end-forming core portions 62 and 64.

As will be apparent from the foregoing, particularly in view of FIGS. 6, 7, 9 and 10, the molding apparatus of the invention has mold cavity-forming members which part along arcuate partition lines 21 (FIGS. 9 and), which fall along each side of the molded objects and which are coextensive with and generally fall along the mean radius of curvature of the molded objects. Each such curved parting line on the molded objects (designated 21a in FIG. 11) is thus located in a plane which is oriented vertically (according to the orientation of the molding apparatus shown in the accompanying drawings) and for each individual molded object, the planes of the two oppositely disposed parting lines 21a are parallel and spaced on opposite sides of the plane in which the longitudinal axis of the object itself is located. This arrangement serves to typify and, to a large extend, characterize the basic nature of the present apparatus. By virtue of the coordinated relative movements of the different parts of the apparatus, as detailed hereinabove, an automated apparatus for producing curved objects such as conduit elbows is provided by the invention having very substantial advantages and benefits when compared to existing known apparatus, as will readily be appreciated by those skilled in the art.

It is entirely conceivable that upon examining the foregoing disclosure, those skilled in the art may devise embodiments of the concept involved which differ somewhat from the embodiment shown and described herein, or may make various changes in structural details to the present embodiment. Consequently, all such changed embodiments or variations in structure as utilize the concepts of the invention and clearly incorporate the spirit thereof are to be considered as within the scope of the claims appended herebelow, unless these claims by their language specifically state otherwise.

The embodiments of the invention in which an exclusive property or privilege is claimed are defined as follows:

1. Apparatus for simultaneously injection-molding a plurality of curved generally tubular objects having hollow internal passages, comprising in combination: a first mold structure means forming a series of adjacent mutually spaced curved concavities, the peripheral surface of each such concavity defining a longitudinal half of the outer peripheral configuration of one such curved object; and second mold structure means forming a series of adjacent mutually spaced curved concavities, the peripheral surface of such concavity defining the other longitudinal half of the outer peripheral configuration of said one such curved object; said first and second mold structure means being relatively moveable toward each other into a closed position and away from each other into an open position; said mold structure means when in said closed position coming into mating contact, with the said concavities of each in register with those of the other such that each pair of registering concavities defines the outer periphery of a complete individual object; mold core means defining the curved inner periphery of an individual such object within each such pair of registering concavities when said mold structures are in said closed position; each of said concavities having a pair of longitudinal edges mating with like edges of the concavity in register therewith when said mold structure means are in said closed position to form mold partition lines; said concavities being disposed and oriented such that a major portion of each of the said mold partition lines of each pair of registering concavities lies in a plane which is spaced from the like plane of the other such line, and means when said one mold structure means is in said open position along a path of movement which carries a molded object away from the other such mold structure means to wipe such object off said mold core means and eject such object from the mating concavities in which the object was molded.

2. The injection-molding apparatus of claim 2, wherein said objects and the concavities defining the periphery thereof are curved along a line of constant curvature having a center of curvature, and wherein said means for moving said one mold structure means to eject a molded object moves such mold structure in a rotary movement about the said center of curvature of such line.

3. The injection-molding apparatus of claim 2, wherein said one mold structure means defines a saddle for each molded object which vertically supports such object and serves to retain the same in place during relative movement of said two mold structure means into their said open position.

4. The injection-molding apparatus of claim 3, wherein other portions of said mold core means are coupled to said means for moving said one mold structure means, said means for moving including means to move other portions of said mold core means out of and away from the molded objects prior to said ejecting movement of said one mold structure means.

* * * * *